Figure 1:
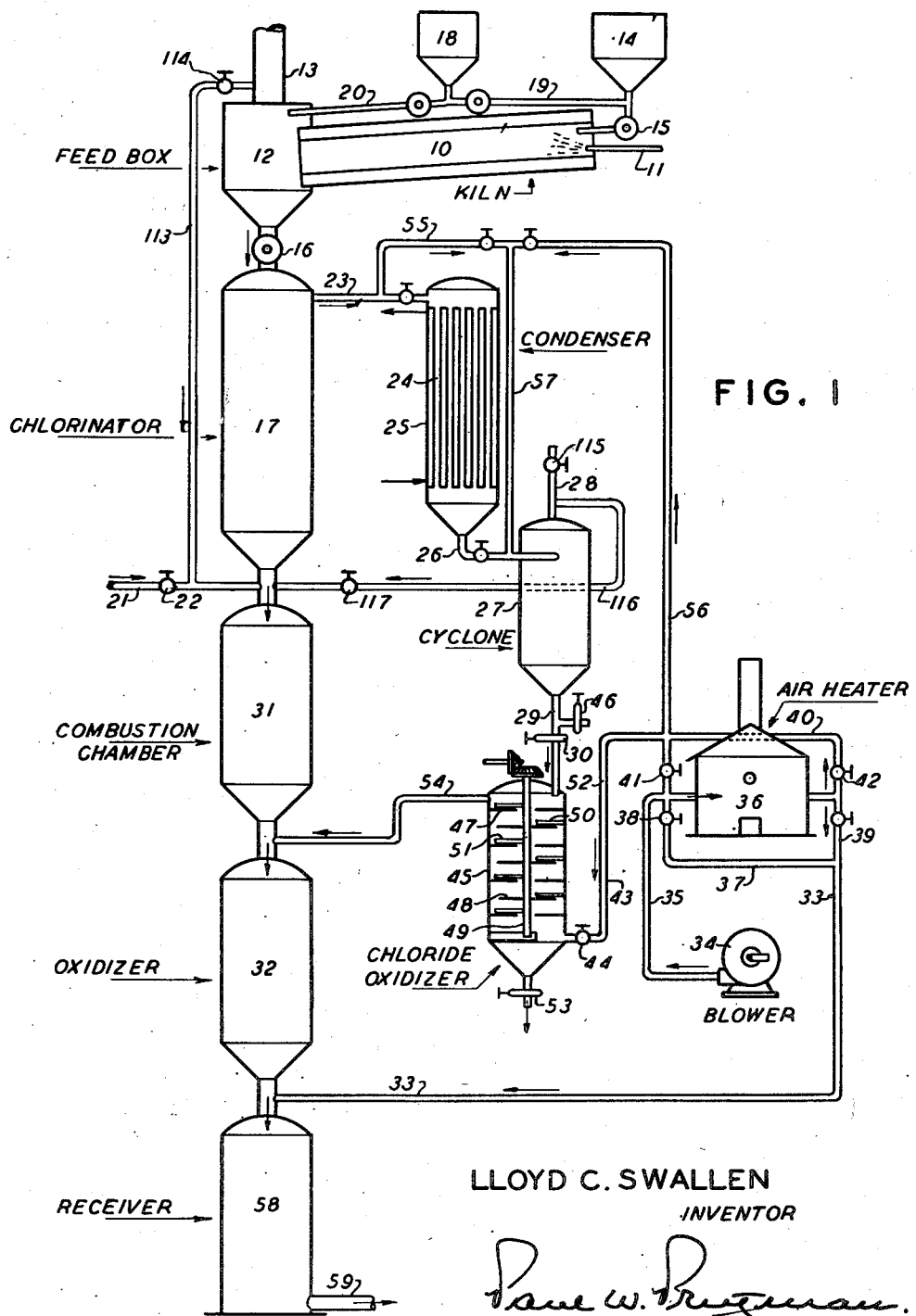

LLOYD C. SWALLEN
INVENTOR

ATTORNEY

Patented Apr. 18, 1950

2,504,357

UNITED STATES PATENT OFFICE 2,504,357

PURIFICATION OF SILICEOUS MINERALS

Lloyd C. Swallen, Lombard, Ill., assignor to Great Lakes Carbon Corporation, Morton Grove, Ill., a corporation of Delaware Application September 23, 1947, Serial No. 775,637

7 Claims. (Cl. 252—457)

This invention relates generally to the separation from siliceous minerals such as diatomaceous earth, siliceous clays, silica sands, siliceous ores and the like, of certain metals which form volatile chlorides on contact with chlorine at high temperature and under suitable conditions.

As a rule, but not necessarily, the metal thus separated will have been present in the mineral in such quantity as to be considered a contaminant, and in such cases the objective of the invention is to purify the mineral by freeing it from iron or similar compounds which tend to discolor or to otherwise depreciate it.

A specific objective of the invention is the removal of iron from diatomaceous earth, improving the color of the earth and fitting it for uses in which the presence of iron may be objectionable.

A specific objective of the invention is the purification of siliceous clays used as catalysts, by the removal of contaminating iron compounds.

The invention comprises certain modifications of and additions to the well known process of converting contaminating iron to the volatile chloride, these improvements increasing the efficacy of the treatment while reducing its cost and also rendering the process applicable to the treatment of minerals containing alkaline earths.

The prior art, as exemplified in British Patent 5,379 of 1907 to Thomson and Barr and in several United States patents of later date, contains numerous disclosures of the treatment with gaseous chlorine of mixtures of carbon with iron-containing diatomaceous earth (also known as kieselguhr), sand and the like, at high temperature. This simple process is not well adapted to the purification of minerals such as diatomaceous earth when they contain calcium and magnesium carbonates in addition to iron. In the prior art procedures the alkaline-earths, which are converted to nonvolatile chlorides during the removal of the iron, remain in the finished product in which they are highly undesirable by reason of their ready water-solubility. Further, in the very common case in which the proportion of alkaline-earths is materially greater than the iron content, the consumption of chlorine and the cost of the operation are unduly increased. Again, in the prior art procedures as applied to a highly absorbent mineral such as diatomaceous earth, the vapors of iron chloride (and any accompanying aluminum chloride as well as other volatilizable metal chlorides) are imperfectly removed and consequently the reduction of the iron content to the most desirable low level is difficult or impossible.

I have improved over the prior art processes in the following principal respects: in providing for the conversion of the soluble alkaline-earth chlorides to the substantially insoluble oxides or silicates, with the recovery of the chlorine for reuse; in performing the chlorination with the aid of sweep gas by which the volatile chlorides are removed from the chlorination chamber as fast as formed; in providing for the condensation of the iron, aluminum, and other volatile metal chloride vapors without risk of choking of the condensing equipment; in providing for the ensured removal of any residues of carbon carried down from the chlorination step, and finally, in providing means for the accurate control of temperature and concentration of gaseous agent at each stage of the process.

The method of the invention comprises a treatment of the mineral in four primary stages and of the effluent gas and vapor in two auxiliary steps, as follows:

A. Heating the mineral to a suitable temperature (e. g., 700° to 900° C.) in an atmosphere which may be inert or reducing according to the condition in which the iron occurs in the mineral to be treated;

B. Chlorinating the mineral at a suitable temperature (e. g., 800° to 1100° and preferably about 1000° C.) in admixture with a reducing agent such as carbon or a carbon containing substance, with the aid of a flow of a substantially non-oxidizing sweep gas;

C. Removing excess carbon by oxidation with a controlled quantity of oxygen-containing gas and thereby reducing the free oxygen content thereof to provide the sweep gas for the preceding step;

D. Oxidizing the nonvolatile chlorides from the heated carbon-free mineral with a controlled flow of air which may be preheated and thus regenerating the chlorine of such chlorides for reuse, the chlorine-laden gas containing a reduced oxygen content from this step passing in counterflow through steps C and B;

E. Condensing the volatile chlorides from the gaseous effluent from step B, at such temperature that the chlorides pass in the form of a sublimate into a settling chamber;

F. (Optional) oxidizing the condensed volatile chlorides and returning the regenerated gaseous chlorine into step B either directly or preferably through step C;

G. (Optional) oxidizing the volatile chlorides in the vapor phase and utilizing the regenerated chlorine otherwise than by recycling.

Figure 2:
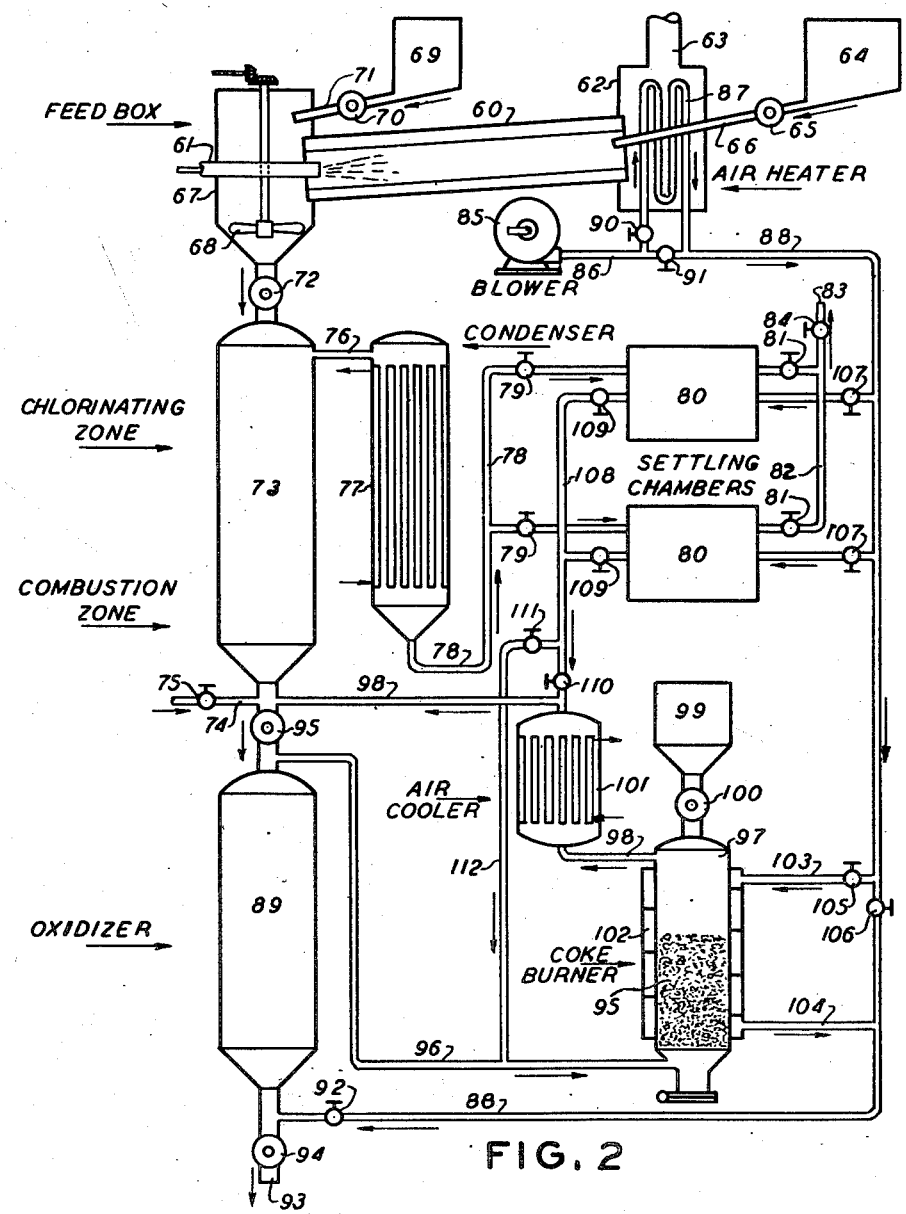

The invention may best be understood with reference to the attached drawings and the following description thereof, in which Fig. 1 is a diagrammatic flow-sheet of a form of the process adapted to the treatment of minerals relatively low in calcareous impurities, and Fig. 2 is a similar flow-sheet of a modified form of the process, adapted to the treatment of minerals relatively high in alkaline-earth content, particularly calcium.

Referring first to Fig. 1, a heating means for the mineral is illustrated as a rotary kiln 10 internally fired as at 11 and discharging into a breeching 12 having a vent 13 for spent flue gases. The kiln is supplied with a stream of the mineral to be purified from a bin 14 through a star or other feeder 15 affording an accurately controllable delivery. The mineral heated in the kiln is passed from the breeching through a controllable feeder 16 into the upper end of chlorinator 17.

A bin 18 contains finely divided coke or other carboniferous matter which is fed at a controlled rate either into the stream of mineral entering the kiln as by conduit 19 or into the breeching as by conduit 20. If the feed enters the upper end of the kiln, it is possible to use pulverized coal, asphaltic petroleums and other carboniferous substances containing volatile hydrocarbons, but if the feed occurs at the outlet end of the kiln, only a dry carbon should be used to avoid loss of chlorine by reaction with hydrocarbon vapors.

The mineral as fed to the kiln should be of such particle size as to permit free flow of gases through the column while offering as much surface exposure as possible. Chlorination is accelerated by reduction in particle size while gas flow is promoted by increasing the size of the component particles and also by sizing within a relatively narrow range. It is difficult to handle light siliceous minerals such as diatomaceous earth in powdered form by reason of the excessive tendency to carry-over and a feed of that mineral should preferably have a minimum particle size of $\frac{1}{8}$" to $\frac{1}{4}$" and a maximum size of about 1". These are optimum, not critical dimensions, as it is possible to chlorinate the product of a jaw crusher after passing through a 1½" to 2" mesh screen.

The feed of mineral should be raw or only dried and the temperature of the kiln should be controlled (by regulation of the kiln fire) to avoid actual calcination, which makes the iron compounds less readily reactive with chlorine. A temperature ranging from 600° to 900° C. is recommended.

The atmosphere within the kiln and the point at which the carbon is introduced will depend on the condition in which the iron compounds exist in the mineral. If the iron is present in the bivalent state, e. g., as the carbonate or humate, the feed of carbon may be introduced at the discharge end of the kiln (conduit 20) and an inert or reducing atmosphere maintained. If already oxidized, as by previous heat treatment, admixture is promoted and the reduction of the iron to a lower valence state or more reactive condition is accelerated by feeding the carbon at the upper end of the kiln (conduit 19).

The mixture of mineral and carbon passes downwardly through the chlorinator 17 in counterflow to a stream of sweep gas containing little or no free oxygen and mixed with free chlorine. At least a part of this chlorine is that which is liberated by oxidation of nonvolatile chlorides and mixed with the sweep gas in later stages of the operation as will be described; any make-up chlorine which is required is introduced into the lower end of the chlorinator through pipe 21 controlled by a valve 22. The source of supply of make-up chlorine is not shown, but it will be assumed to originate outside the system illustrated.

The chlorinator is maintained at a temperature preferably about 1000° C. as noted above, at which temperature the chlorine reacts energetically with the iron impurity and with certain aluminum compounds and the like volatile chloride forming substances which may be present. These chlorides which vaporize at a lower temperature are carried out of the chlorinator as fast as formed by the current of sweep gas to be discharged through conduit 23. The function of the carbon, as is well known, is to combine with the oxygen liberated by these reactions from the various oxygen containing metal compounds which may be present. Any alkaline-earth metal compounds present in or added to the mineral are simultaneously converted to the chlorides, which are nonvolatile at even much higher temperatures and consequently remain in the mineral leaving the chlorinator.

The vent gas from the chlorinator, which under proper conditions should consist of nitrogen and oxides of carbon together with vapors of iron (aluminum and other metal) chloride, passes through conduit 23 to the tubes 24 of a water-cooled condenser 25 in which it is cooled to a temperature (e. g., 250° to 300° C.) at which the chlorides solidify without passing through a liquid phase. This condenser should be so constructed that the tubes are accessible for occasional cleaning, as the sublimate may accumulate on the tube walls, particularly if the gas velocity be low.

The cooled gas, carrying finely divided solid chlorides, passes through conduit 26 into a cyclone or other suitable separator 27, in which the solid chlorides subside. The off-gas is vented at 28 while the separated chlorides are withdrawn through conduit 29 and valve 30. The disposition of these chlorides will later be described.

With suitable balancing of conditions in the chlorinator, the effluent gas through vent line 28 should be free from gaseous chlorine but is likely to contain some vaporous or solid chlorides and may need to be further cooled and passed through a dust collecting chamber, an electrical precipitator or a water-washing step to prevent creation of a nuisance. As such steps are well-known and there is a wide choice of means, they are not illustrated.

On leaving the lower end of the chlorinator the mineral should contain some of the carbon with which it was originally mixed, as well as the nonvolatile chlorides. The remaining carbon is oxidized in combustion chamber 31 and the nonvolatile chlorides are oxidized in oxidizer 32 by a current of more or less heated air introduced through conduit 33, thus supplying the current of sweep gas. The air used undergoes final conversion to form a sweep gas containing substantially no free oxygen by reacting with carbon mostly or all in combustion chamber 31 and residually when necessary in the lower part of chlorinator 17.

This air is provided by a blower 34 which takes in air at atmospheric temperature and delivers it through conduit 35 to a fired heater indicated at 36. A looped conduit 37 connects the hot and cold ends of the heater, the two branches being valved at 38 and 39 to permit air at any temperature between atmospheric and the maximum attainable in the heater to be delivered from the loop into conduit 33. A similar loop 40 having valves 41 and 42 permits air at any desired temperature to be delivered through conduit 43 and valve 44 to the lower end of a chloride oxidizer 45 which will now be described.

The chlorides collecting in cyclone 27 may be withdrawn for utilization as such, through valve 46, if of sufficient purity and if a market be available. Under some circumstances, however, it may be more desirable to utilize them by recovering and reusing their content of chlorine.

In this procedure the chlorides are withdrawn into a converter in which they are kept in motion while being treated with heated air. Numerous devices may be adapted to this use, a suitable form being illustrated in Fig. 1. This device may consist of a cylindrical shell 45 containnig a succession of flat rings 47 attached to the shell and alternated with discs 48 attached to a rotating vertical shaft 49. Fixed scrapers 50 projected inwardly from the shell ride close to the surfaces of the discs and scrape solid deposits over their edges. Rotating scrapers 51 attached to the vertical shaft move solid deposits from the rings and direct them into the central opening. The chlorides are introduced onto the uppermost ring or disc and pass downwardly, being oxidized by contact with the heated air introduced through conduit 52. The product, ferric oxide with perhaps some aluminum and other metal oxides, in pulverulent form, falls into the coned bottom of the shell and is withdrawn from time to time through a gate 53.

The spent air together with the regenerated chlorine escapes through conduit 54. This gaseous mixture may be introduced directly into the lower end of the chlorinator, but as it is likely to contain some unconsumed oxygen, I prefer to introduce it into the bottom of combustion chamber 31 as illustrated, there to be relieved of its residual oxygen by the oxidation of carbon therein as previously described.

In some instances, particularly in the treatment of minerals, containing very small proportions of iron and other volatile chloride forming impurities, the condensation of the volatile chlorides may involve a cost in excess of their value when recovered. This by reason of their corrosive character when brought into contact with moist air, their tendency to deliquesce, and the labor incident of preventing stoppages of the condensing and separating apparatus.

These difficulties may be avoided by oxidizing the volatile chlorides in the vapor phase and at relatively high temperature. For example, the stream of hot gas and vapor leaving the chlorinator through conduit 23 at about 1000° C. may be bypassed around condenser 25 as by conduit 55, a stream of hot air being drawn from conduit 40 through conduit 56, and the streams mixed in conduit 57 which discharges into cyclone 27. Above the temperature of vaporization of these chlorides, the oxidation thereof is usually quite rapid, no chlorides are reduced to liquid or solid form and the settling chambers receive only noncorrosive and incoherent iron and other oxides. The gases discharged from vent 28 contain the chlorine regenerated from the volatile chlorides, this being far too much diluted to be returned to the chlorinator but capable of utilization by chemical reaction, as in the production of hypochlorites.

The air stream entering the lower end of oxidizer 32 at an optimum temperature, which may range from atmospheric to 800° C. but which should not exceed 1000° C. except in the case for the formation of magnesium silicates where the temperature may be up to about 1400° C. or thereabouts, converts the nonvolatile calcium and magnesium chlorides to oxides (or silicates as later described) and regenerates their content of chlorine to the free state. A material proportion of the oxygen of the air stream is thus removed.

Passing upwardly through combustion chamber 31 the partly spent air carrying the regenerated chlorine is substantially relieved of its residual oxygen by reaction with carbon. It is essential in most cases, and always in the treatment of diatomaceous earth, that the mineral discharged from the oxidizer be completely free from carbon, which would strongly depreciate its color. Since it is highly undesirable to leave any material proportion of free oxygen in the stream of sweep gas passing from the top of the combustion chamber into the chlorinator, an accurate balancing of carbon supply against air supply is necessary. This subject will be considered at a later point.

The mineral leaving the oxidizer, now substantially free from iron and from soluble salts and which may be of reduced aluminum or the like impurity content, passes into a closed receiver 58 from which it is withdrawn at 59 by means of a screw feeder or other suitable seal.

Fig. 2 shows the same essential steps as Fig. 1 but illustrates several modifications as to details of manipulation and means for controlling temperatures and volumes of gases at different stages of the operation. It also shows combustion chamber 31 and oxidizer 32 combined in a single unit 89, as is permissible, although the lower section of chamber 73 may also serve as a combustion zone.

Referring to Fig. 2, a rotating kiln 60 is fired at its discharge end as at 61, the spent fire gases passing into a smoke box 62 having a stack 63. The feed of mineral is taken from a bin 64 by a feeder 65 and enters the upper end of the kiln through a feed spout 66.

The heated mineral is discharged into a receiver 67 provided with a rotating paddle 68. A controlled stream of dry comminuted carbon is drawn from a bin 69 by a feeder 70 and passes into the receiver through conduit 71.

The mixture of carbon and hot mineral produced by rotation of the mixing paddles passes through a feeder 72 into the upper end of chlorinator 73 in which it is treated with chlorine intermixed with a sweep gas containing substantially no free oxygen as described in connection with Fig. 1, the quantity of chlorine required for make-up being introduced from an outside source through pipe 74 and control valve 75.

The mixture of sweep gas and vapors of volatile chlorides emerging from the chlorinator through conduit 76 passes through a water-cooled condenser 77 in which it is cooled to a temperature below the solidifying point of the chlorides. If the gas velocity through the condenser tubes be maintained at a level producing turbulence, the solidified chlorides will largely be carried forward in the form of suspended, snow-like crystals. The gaseous stream in which the chlorides are suspended passes through conduit 78 having valved branches 79—79 into one or the other of settling chambers 80—80, in which the solids are deposited and collected. The gaseous residue, now free from oxygen and from chlorine, passes through one or the other of valves 81—81 into a collecting conduit 82 from which it may be vented, wholly or in part, through an outlet 83 and a valve 84.

The air supply required by the operation is provided by a blower 85 discharging into a conduit 86, a loop 87 branched from this conduit being located in smoke-box 62 in which a moderately high flue gas temperature obtains. The temperature of the air passing through conduit 88 to the lower end of oxidizer 89 may be controlled by varying the relative openings of valves 90 and 91 in the two branches of conduit 86.

In the oxidizer 89 the nonvolatile chlorides remaining in the mineral are oxidized with regeneration of their chlorine, as above described, the air supply required for this purpose being adjusted by means of valve 92. The finished mineral product, free from carbon, iron and the like volatile chloride forming substances and containing no water soluble salts, is withdrawn from the oxidizer through discharge pipe 93 and a suitable seal 94.

It has been found by experience that while the oxidation of magnesium chloride requires only about twice its calculated quantity of oxygen, the oxidation of calcium chloride requires the presence of silica and a much greater excess of oxygen, approximately eight times the calculated quantity. Thus where the proportion of calcium in the feed is relatively high, say in excess of about 5%, such large quantities of unconsumed oxygen may pass from the oxidizer into the combustion zone as in Fig. 1 that a proportionately large amount of carbon will be required in the feed mixture. The combustion of such quantity of carbon in the combustion zone to produce the sweep gas is likely to produce an undesirably high temperature, and one which is out of control.

Since this invention is concerned primarily with producing solid siliceous products of enhanced value, the temperatures to which the mineral is subjected throughout the process must be so controlled as to avoid any appreciable sintering which tends to destroy desirable physical properties thereof. This is especially true, for example, in the treatment of bentonitic clays, diatomaceous earth, and the like to produce hydrocarbon conversion catalysts or catalyst supports. Continuing the example, if the mineral contains relatively large amounts of chlorinatable impurities, then it will be desirable to conduct the chlorination at the lower temperatures toward 800° C. and the subsequent oxidation steps at temperaures that will avoid appreciable sintering, and which may be in some instances as low as 500° C.

This difficulty in controlling temperatures, especially during the oxidation steps, may be avoided in the manner illustrated in Fig. 2, by placing a seal 95 between chlorinator 73 and oxidizer 89, and detouring the oxygen-containing gas through conduit 96 and a coke combustion chamber 97 in which the oxygen is partially or entirely consumed, the deoxygenated gas returning to the bottom of the chlorinator through conduit 98. The coke chamber is supplied with coke at suitable intervals from a bin 99 by a feeder 100.

It is desirable to provide some form of temperature-modifying means in the course of conduit 98. This is illustrated at 101 as a water-cooled tubular heat interchanger, although a waste heat boiler or other means for heat transfer may be substituted.

The temperature of the air passing from loop 87 into conduit 88 may be too low to produce the required oxidation of the fixed chlorides in oxidizer 89, and Fig. 2 illustrates a means for increasing this temperature to the desired degree. This consists of a jacket 102 surrounding coke chamber 97 which, with conduits 103 and 104 forms a loop from conduit 88. The quantity of air detoured through this jacket and heated therein is controlled by valves 105 and 106.

The chlorides collecting in settling chambers 80—80 may be removed in the solid form, one of these chambers being shut down for cleaning while the other is in operation. If it should be more profitable to recover and reuse the chlorine content of the volatile chlorides, they may be oxidized by admitting heated air from conduit 88 through one or the other of valves 107—107, the mixture of partly deoxygenated air and gaseous regenerated chlorine passing through a collecting conduit 108 and one or the other of valves 109—109 to conduit 98 and thus into a combustion zone in the lower part of the chlorinator 73. In the event the residual oxygen content of the regenerated chlorine-containing gases is too great for controlled removal in the combustion zone of chamber 73, the oxygen content may be reduced or eliminated in coke burner 97, together with similar treatment of any gases from oxidizer 89 by closing valve 110 and passing part or all of the vent gas from the settling chambers through valve 111 and conduits 112 and 96.

The quantities of reactants required in the above described operations vary with the quantity of iron and/or other metals to be removed by chlorination and the quantity of the non-volatile chlorides of calcium or other alkaline-earth and the like contained in the mineral when it reaches the oxidizer.

As noted above, only about one-eighth of the oxygen of the air entering the oxidizer will be consumed in oxidizing calcium chloride. Thus the minimum air supply at this point may be calculated on the calcium content of the mineral charge from the following reaction equation, thus $$8O_2 + 2CaCl_2 + 2SiO_2 \rightarrow 2CaSiO_3 + 7O_2 + 2Cl_2 \quad (1)$$

This excess oxygen is usually sufficient to oxidize any other non-volatile chlorides, such as magnesium chloride, which are much more readily reactive with oxygen, except in the unlikely event, for instance, that the mineral contains a much greater proportion of magnesium than of calcium.

The chlorine-containing gas leaving the oxidizer will therefore contain a considerable proportion of free oxygen, which must be substantially reduced before the gas enters the chlorinator 17 of Fig. 1 or substantially removed before the gas proceeds into the chlorinating zone of element 73 of Fig. 2. Since the gas from the oxidizer is passed upwardly through the indicated zones with only partial reduction in oxygen content during liberation of chlorine, the quantity of carbon introduced with the mineral feed must be sufficient to consume the excess oxygen in the formation of the sweep gas, as well as the oxygen liberated in the chlorination of the various metal compounds in the mineral. For example, the carbon required for the treatment of an impure diatomaceous earth may be determined from the iron and calcium content by calculations based on representative process reactions given in the following equations:

$$C + 2Cl_2 + 2FeO \rightarrow CO_2 + 2FeCl_2 \quad (2)$$
$$C + 2Cl_2 + 2CaO \rightarrow CO_2 + 2CaCl_2 \quad (3)$$

and $$7C + 7O_2 \text{ (from Eq. 1)} \rightarrow 7CO_2$$

Where the mineral treated contains magnesium, aluminum and other chlorinatable impurities, then the foregoing calculations will likewise be based upon additional equations governing the process reactions of these components with chlorine, carbon and oxygen (air).

If the quantity of calcium in the feed be relatively low, of the order of 1%, the quantity of sweep gas produced in oxidizing the calcium chloride may be insufficient, requiring more than an eight to one excess of air and a corresponding increase in the carbon content of the feed mixture.

However, instead of increasing the carbon and oxygen (air) requirements in such instance, I may utilize certain other process sources of gases containing little or no free oxygen. For instance, a controlled amount of flue gases, when operating the process with the admixture of a "dry" or volatile-free source of carbon, may be drawn by suitable means not shown from stack 13 (Fig. 1) through conduit 113 and valve 114 and passed into the chlorinator with any make-up chlorine through line 21. Or, I may employ the vent gases obtained as in line 28 (Fig. 1) from the condensation of the volatilized chlorides with the especial advantage here that should any residual chlorine or chlorides be present in such gases, these may be recovered within the process. This latter source of sweep gas, also illustrated in Fig. 1, is supplied in controlled amounts to chlorinator 17 by means of valves 115 and 116 and conduit 117.

So long as the relation of air supply to calcium chloride in the oxidizer is held constant, the chlorine content of the gases evolved from the oxidizer will be constant. The function of the coke chamber of Fig. 2 is not to vary the quantity of sweep gas, but to transfer a desired proportion of the heat generated in deoxidizing the gas from the combustion chamber (Fig. 1), or the combustion zone in the chlorinator (Fig. 2), to an external element and thus to permit the temperature of the gases taking part in the chlorinating step to be held at a desired level for the purposes previously indicated.

The ultimate consumption of chlorine in the process is nominal if the volatile chlorides are oxidized (as in elements 45 or 80) as the chlorine combining with alkaline earths in the chlorinator is substantially completely regenerated and returned in the sweep gas. When oxidizing in the vapor phase, as in conduit 57 of Fig. 1, the chlorine which combines with iron or other volatilizable mineral impurity is withdrawn from the cycle and must be replaced. For example, with diatomaceous earth this consumption may be calculated on the formation of ferrous chloride from the iron content of the mineral, as $$2FeO + 2Cl_2 \rightarrow 2FeCl_2 + O_2$$

*Examples*

The following table illustrates the results obtained by the application of the described treatment (without oxidation of the volatile chlorides) to various samples of diatomaceous earth:

| | Test No. | | | |
|---|---|---|---|---|
| | 1 | 2 | 3 | 4 |
| Analysis of Mineral: | | | | |
| Iron content as Fe__percent__ | 1.0 | 1.0 | 2.0 | 2.0 |
| Calcium content as Ca do____ | .0 | 0.5 | 5.0 | 8.3 |
| Magnesium content as Mg percent__ | 0.0 | Trace | Trace | Trace |
| Temperature of Preheat_____°C__ | 700 | 700 | 700 | 700 |
| Powdered coke added in percent of mineral_____ | 0.4 | 1.0 | 7.0 | 10.3 |
| Temperature in chlorinator_°C__ | 1,000 | 1,000 | 1,000 | 1,000 |
| Make-up chlorine added, litre per gram mineral_____ | 0.004 | 0.004 | 0.009 | 0.009 |
| Temperature of air entering oxidizer_____°C__ | 800 | 600 | 700 | 20 |
| Air supply to oxidizer, litre per gram mineral_____ | 0.021 | 0.062 | 0.560 | 0.940 |
| Chlorine concentration in gases from oxidizer, volume percent_ | 0.0 | 5.0 | 5.0 | 6.0 |

The mineral product from these operations was white and substantially iron-free (all below 0.03% Fe) and contained no water-soluble substances.

A modification of this process which may be desirable under some circumstances consists in substituting an oxidizable chloride of low cost, such as calcium chloride or magnesium chloride, for the chlorine required for the removal of iron and other similarly volatilizable impurities of the mineral. In this practice, which may be carried out in a portion of the apparatus shown in Fig. 1, the mineral is heated in retort 10 and the requisite quantity of carbon together with 1 mole of the alkaline earth chloride (dry) per mole of iron and the like impurities in the mineral is introduced into the breeching 12, sufficient admixture for the purpose being produced in passing through feeder 16 into chlorinator 17. This introduction should be made at a point at which the mineral is completely dry, to avoid thermal hydrolysis with loss of chlorine through the stack as hydrogen chloride. The added chloride, being nonvolatile, passes through the chlorinator without change other than fusion which causes it to disperse through the feed of mineral.

On reaching the oxidizer the calcium chloride admixed with the siliceous mineral is oxidized and chlorine liberated, the chlorine passing back to the chlorinator in which it converts iron and the like to a volatile chloride. The iron chloride may be separated from the vent gas in cyclone 27 of Fig. 1 or in the settling chambers 80 of Fig. 2, or the apparatus may be simplified still further by eliminating condenser 25, cyclone 27 and chloride oxidizer 45 and spraying down the hot vent gas with water to remove the extremely soluble chlorides, which may then be had in the form of a highly concentrated solution.

The process in any of the described forms offers the following advantages as compared with prior art methods of removing iron and other volatilizable impurities from diatomaceous earth and other siliceous minerals:

a. The mineral product may readily be brought to a very low or even a disappearing iron content and is completely free from soluble salts if not originally contaminated with sodium chloride. It is thus of highly superior quality for use in many aqueous systems, for example as a filteraid, as a filler for high grade papers and as a pigment in paints. The absence of iron and of fusible salts makes it extremely desirable as a catalyst material or support, particularly in cracking operations.

b. The high temperature cycle is superior to acid washing for removal of iron in being more completely effective, in avoiding tedious water-washings and subsequent drying, and in yielding an anhydrous product;

c. Unless the anhydrous volatile chlorides initially obtained are in sufficient demand to justify collection and working up as final products, the consumption of chlorine may be reduced to a negligible element of cost by oxidation and recycling of the chlorine thus recovered;

d. The fuel requirement is little if any greater than would be required for simple calcination and in some instances as with some varieties of raw diatomaceous earth there may be sufficient organic matter naturally present to supply the carbon required in the chlorination step;

e. The process affords a means for utilizing lime-contaminated diatomaceous earth for special purposes, it being possible by maintaining a suitable temperature level in the oxidizer to convert calcium and magnesium chlorides mixed with diatomaceous earth to the corresponding silicates. While calcium hydroxide, oxide and carbonate are nonreactive with silica at low temperature, at an oxidizer temperature of the order of 800° C. calcium chloride intimately dispersed throughout the siliceous mineral, reacts by means of oxidation to produce the corresponding alkaline-earth metal silicate. A higher temperature is required for the production of magnesium silicate, and at the above oxidizing temperature the magnesium appears in the product as the oxide. The silicate which is formed and occurring as films on the surfaces of the diatoms or other siliceous particles, does not detract from the value of the product as a filter-aid, pigment or filler and is wholly water-insoluble;

f. The process offers a convenient and inexpensive means for producing calcium silicate and magnesium silicate in a form in which the well-known decolorizing and purifying properties of these substances are accentuated by spreading them in thin films on a supporting medium which in a mass is highly permeable to liquids. In this practice a suitable source of the alkaline-earth metal, such as finely comminuted limestone, dolomite or magnesite, chalk or lime, is added to the charge entering the chlorinator, a proportion as high as 10-15% of the weight of the diatomaceous earth being permissible. These compounds are converted into nonvolatile chlorides in the chlorinator and reconverted with the recovery of the chlorine in the oxidizer and the utilization thereof, as above described.

While the method is described as applied to the purification of diatomaceous earth, it is functional and applicable to other siliceous minerals. Furthermore, in addition to the formation and removal of the volatile chlorides of iron and aluminum as described, the method is applicable to the purification and alteration of siliceous minerals containing other components such as antimony, arsenic, mercury, molybdenum, nickel, tin, titanium, tungsten, uranium, vanadium and the like which form volatile chlorides below about 1100° C.

It will be understood that the details of manipulation and apparatus discussed herein are illustrative only and that the scope of the invention is measured by that of the attached claims.

I claim as my invention:

1. The method of manipulating an iron-containing diatomaceous earth to improve its properties which comprises: mixing with said earth carbon and a basic compound of an alkaline-earth metal; bringing said mixture to an elevated temperature; treating said heated mixture with gaseous chlorine and thereby converting said iron to the form of a volatile chloride and said basic compound to the form of a nonvolatile chloride; removing said volatile chloride, and treating the hot residual earth containing said nonvolatile chloride with an oxygen-containing gas, thereby liberating the chlorine from said nonvolatile chloride and producing a substantially water-insoluble alkaline-earth metal compound combined with the thus treated diatomaceous earth.

2. A method substantially as recited in claim 1 in which said treatment with oxygen-containing gas is conducted at the temperature at which the metal component of said nonvolatile chloride is converted to the corresponding silicate.

3. The method of purifying an iron-containing diatomaceous earth which comprises: producing admixture of said earth with carbon and a chloride of an alkaline-earth metal; bringing said mixture to a temperature of 800-1100° C.; treating said hot mixture with chlorine diluted with a substantially oxygen-free sweep gas and thereby converting said iron to the form of a vaporous chloride, and sweeping out said chloride; treating the hot residual earth containing said nonvolatile chloride with an oxygen-containing gas to liberate chlorine therefrom; eliminating substantially the residual free oxygen content of the chlorine-bearing gaseous mixture by reaction with carbon in said residual earth; and using said liberated chlorine-containing gas to supply chlorine and sweep gas in first said treating step.

4. A method substantially as recited in claim 3, in which said nonvolatile chloride of an alkaline-earth metal is calcium chloride.

5. A method substantially as recited in claim 3, in which said nonvolatile chloride of an alkaline-earth metal is magnesium chloride.

6. A process for purifying siliceous minerals containing compounds of metals whose chlorides are volatile which comprises: providing a mixture of the mineral with a nonvolatile chloride of an alkaline-earth metal and carbon in excess of the amount required to react with oxygen combined with said metal compounds; contacting the mixture with a sweep gas containing chlorine and substantially no free-oxygen at a temperature required for reaction between said metal compounds and chlorine to form vaporous chlorides; removing the vaporous chlorides by means of the sweep gas; oxidizing the hot solid residue with air to release the chlorine from said alkaline-earth chloride; oxidizing the remaining excess part of said carbon to substantially remove residual free oxygen from the gas containing the released chlorine and thereby produce sweep gas and chlorine for use in the first said contacting step.

7. A method of purifying diatomaceous earth containing compounds of iron and of an alkaline-earth metal which comprises the steps of contacting a mixture of said mineral and carbon with chlorine to convert said iron to a volatile chloride, and said alkaline-earth metal to a nonvolatile chloride which remains mixed with the earth, volatilizing said volatile chloride from said earth, the residue thereby produced containing unconsumed carbon; contacting said residue with an oxygen-and-chlorine-containing first gas produced as hereinafter set forth to remove said carbon substantially completely and to produce a substantially oxygen free gas, passing the residual chlorine-containing, oxygen-free gas into contact with said mineral to effect said chlorination, passing the carbon free residue into contact with an oxygen-containing, chlorine-free gas at a temperature above about 600° C. to convert said alkaline-earth chloride to the corresponding oxide and free chlorine thereby producing said first gas, the amount of oxygen in said oxygen-containing, chlorine-free gas being in substantial stoichiometric excess of the chlorine in said chloride.

LLOYD C. SWALLEN.

REFERENCES CITED

The following references are of record in the file of this patent:

UNITED STATES PATENTS

| Number | Name | Date |
|---|---|---|
| 1,578,052 | McAfee | Mar. 23, 1926 |
| 1,824,807 | English | Sept. 29, 1931 |
| 2,030,868 | Hart | Feb. 18, 1936 |
| 2,277,220 | Gailey | Mar. 24, 1942 |
| 2,349,801 | Maier | May 30, 1944 |

FOREIGN PATENTS

| Number | Country | Date |
|---|---|---|
| 5,379 | Great Britain | A. D. 1907 |